T. A. PEEBLES.
REGULATING COMBUSTION.
APPLICATION FILED APR. 21, 1919.

1,338,956.

Patented May 4, 1920.
6 SHEETS—SHEET 6.

WITNESSES

INVENTOR
Thomas A. Peebles
by Darwin S. Wolcott
Atty

UNITED STATES PATENT OFFICE.

THOMAS A. PEEBLES, OF PITTSBURGH, PENNSYLVANIA, ASSIGNOR TO JOHN M. HOPWOOD, OF PITTSBURGH, PENNSYLVANIA.

REGULATING COMBUSTION.

1,338,956.  Specification of Letters Patent.  Patented May 4, 1920.

Application filed April 21, 1919. Serial No. 291,586.

*To all whom it may concern:*

Be it known that I, THOMAS A. PEEBLES, residing at Pittsburgh, in the county of Allegheny and State of Pennsylvania, a citizen of the United States, have invented or discovered certain new and useful Improvements in Regulating Combustion, of which improvements the following is a specification.

It is in some cases the practice to so regulate the escape of products of combustion from the furnace of a vapor generator and the feed of air to the furnace as to maintain a constant pressure, preferably atmospheric, in the furnace regardless of the rate of combustion of fuel. In some cases this uniformity of furnace pressure is attained by regulating the escape of products of combustion and the operation of the blower supplying the air by and in accordance with the pressure of the vapor in the generator or by regulating the supply of air by and in accordance with the pressure in the generator and the escape of products of combustion from the furnace by and in accordance with the pressure in the furnace. It has also been proposed to regulate the escape of products of combustion by and in accordance with the pressure of vapor in the generator and then regulate the supply of air by and in accordance with the pressure in the furnace.

If, in operating a furnace under a balanced draft, it were only necessary to regulate the discharge from the furnace in accordance with the supply of air, or vice versa, the maintenance of a uniform pressure would be comparatively easy, but the flow from the stack must take care of not only the air fed by the fan or blower but also such air increased in volume by the heat in the furnace, and the gases generated in the furnace. The gases generated will vary in quantity and volume with the character of the fuel employed and also with any disturbance of the bed of fuel. As for example, if the fuel should avalanche, or the continuity of the bed be disturbed by a slicing of the fire, there would be a sudden release of gases and a back firing from the furnace.

It has been found that where atmospheric pressure or a higher uniform pressure is maintained in a furnace, operated at high rate of combustion, there is a rapid destruction of the furnace lining due to the fact that the heat can soak through the brick and the heat thus soaking through will injure the brick and metal portions of the boiler setting.

The object of the invention described herein is to provide for maintenance of a minus pressure or a pressure below atmospheric in the furnace and varying such pressure inversely to changes in the demand on the generator, *i. e.* decreasing the furnace pressure with increasing demands and increasing such pressure with decreasing demands. The "demand" on a vapor generator, as the term is used herein, is meant the rate at which it is required to perform its functions. For instance, if a steam boiler were required to deliver steam at a rate equivalent to 1000 boiler H. P. at 200 pounds pressure as a normal demand and for some reason the pressure dropped to say 195 pounds, while the steam output remained at 1000 H. P. the demand on the generator would increase by the amount necessary to maintain the H. P. output and at the same time restore the operating pressure of 200 pounds. The invention is hereinafter more fully described and claimed.

In the accompanying drawings forming a part of this specification.

When applying the improvement described herein to a generator of vapor for the adjustment of the damper or other means controlling the escape of products of combustion from the furnace of the generator and the regulation of the feed of fuel to the furnace by and in accordance with changes both of the dynamic and the static pressure of vapor flowing from the generator, and for the regulation of the feed of air by and in accordance with variations of the pressure of gases in the furnace, it is preferred to employ mechanism described and shown in an application Serial No. 254,975, filed September 20, 1918, said mechanism being so modified however as to adapt it to the present improvement.

Figure 9:
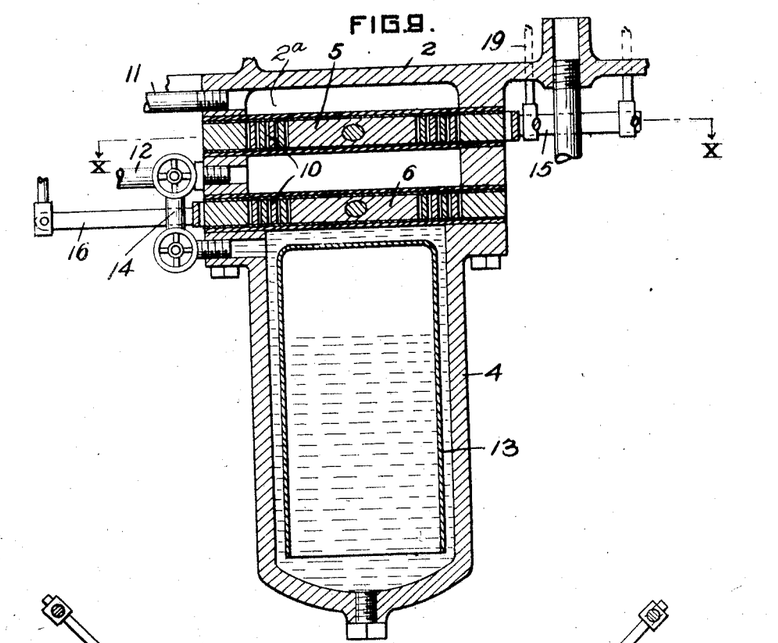
Fig. 9 is a sectional view on a large scale showing the construction of the diaphragm portion of the mechanism whereby the static and dynamic pressure are utilized to operate the regulating mechanism.
Figure 10:
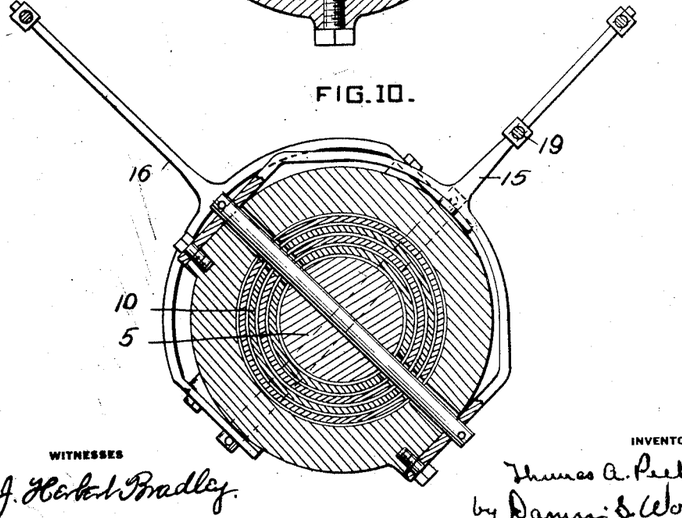
Fig. 10 is a sectional plan view of the same.

As described in said application, the chamber 2ª between the upper diaphragm 5 and the cap 2 is so connected by a pipe 11 (see Figs. 2 and 9) to the conduit C through which vapor flows from the generator as to be subjected to the static pressure of the vapor modified (i. e., either increased or decreased) by the pressure due to the rate of flow of vapor through the conduit C, while the chamber intermediate the diaphragms 5 and 6 is so connected to the conduit by pipe 12 that the chamber 8 intermediate the underside of the upper diaphragm and the upper side of the lower diaphragm will be subjected to static pressure only. The underside of the lower diaphragm is subjected to a constant pressure substantially equal to the normal working pressure desired in the generator or generators. This constant pressure is applied through a fluid pressure cushion formed in the shell 4 in which there is placed an inverted cup 13 and the shell filled with a suitable liquid. In order to place the air trapped in the cup 13 under such pressure the valve in the branch pipe 14 connecting the pipe 12 with the shell 14 is opened and after the desired pressure has been attained, is closed.

Figure 2:
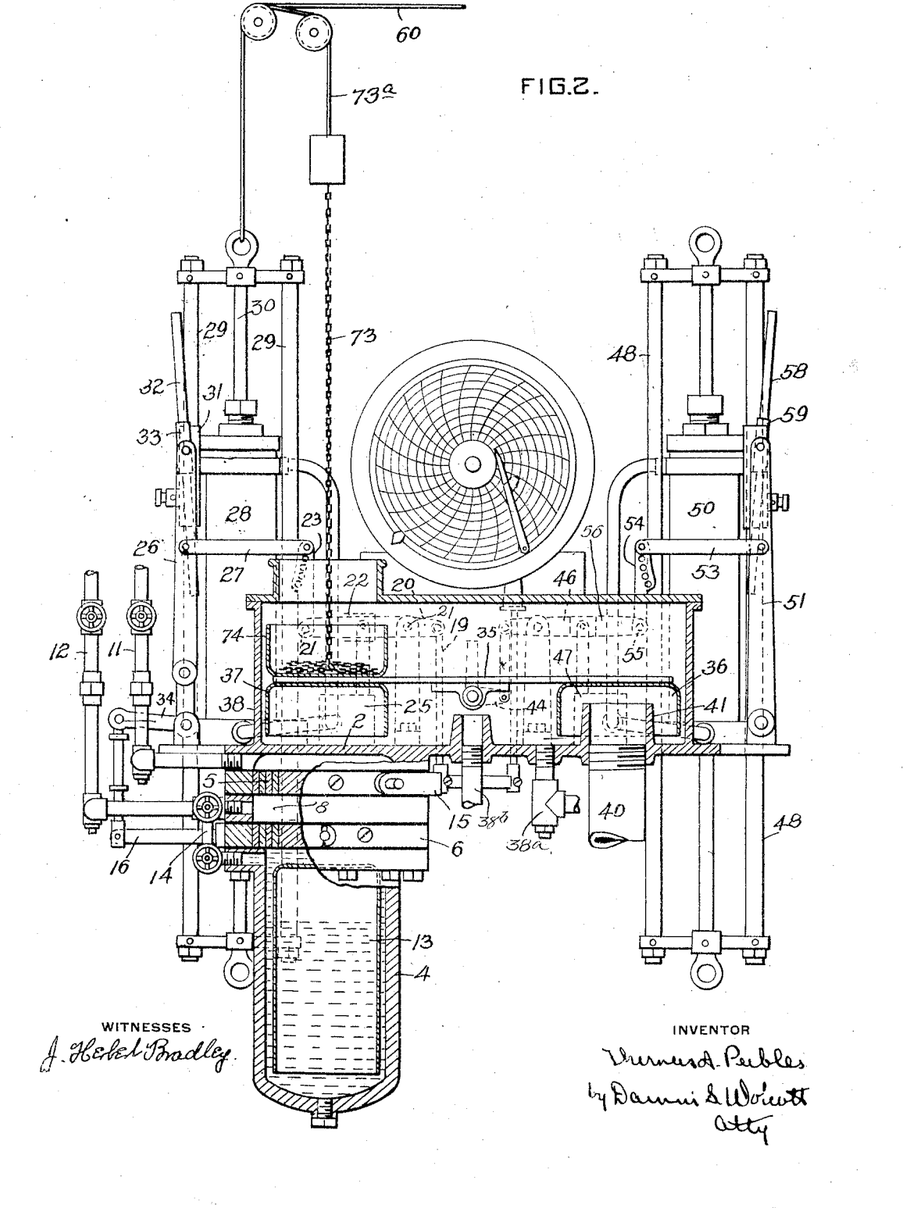
Fig. 2 is a view partly in section and partly in elevation and on an enlarged scale of the controlling mechanism indicated in Fig. 1.

As in the described construction, the upper diaphragm 5 is subjected on both sides, upper and lower, to the static pressure of the vapor in the pipe C, this diaphragm will not be affected by any changes in such pressure but as the pressure acting on the upper side of the upper diaphragm is the total pressure of the vapor flowing through the conduit C, i. e., the static pressure plus or minus the pressure due to the rate of flow of the vapor dependent on the arrangement of the connection of the pipe 11 with the conduit C, any change in the rate of flow of the vapor will cause an incremental movement of the diaphragm 5 proportional to such change. This diaphragm is operatively connected by a lever 15 and rod 19 to a pivotally mounted frame 20 in which is mounted a shaft 21 provided with arms 22 and 23 (the former shown in dotted lines) forming a bell crank lever having the arm 22 connected to the stem of the movable member of a valve mechanism 25 controlling the flow of fluid pressure to and from the cylinder 28 as fully shown and described in the application Serial Number 254,975, above referred to. The arm 23 of the bell crank lever is connected by a link 27 to a swinging member 26 of a compensating mechanism consisting of said member, a shoe 33 pivotally mounted on said member and provided with a groove for the reception of a bar 32, adjustably mounted on a block 31 carried by the frame 29 which is connected to the rod 30 of the piston in the cylinder 28.

These parts are so constructed and arranged that when the frame 20 is shifted by the movement of the upper diaphragm 5, the movable member of the valve mechanism 25 will be shifted up or down and thereby admit fluid pressure to the upper or lower end of the cylinder. On the admission of fluid pressure to the cylinder 28 due to the shifting of the valve mechanism 25, the piston will be moved up or down and its movement will shift the bar 32, which being adjusted at an angle to the axis of the cylinder 28 will slide through the shoe and shift the swinging member 26 and through it the bell crank lever consisting of the arms 22 and 23 independently of the frame 20. The movement of the bell crank lever by the swinging member 26 will shift the movable member of the valve mechanism 25 in the reverse direction to that imparted by the movement of the frame 20 and thereby close the valve. By adjusting the inclination of the bar 32, the movement of the piston of the cylinder 28 on the opening of the valve will be controlled, the extent of such movement being dependent upon the angularity of the bar 32 to the axis of the cylinder. This operation is repeated, *i. e.*, the valve opened in one direction or the other by the movement of the upper diaphragm operating through the frame 20 due to variations in the rate of flow and by a predetermined movement of the piston following such opening of the valve, the latter is again closed by a movement of the swinging member 26 so that the movement of the piston and frame will be incremental and not a full movement equal to the length of the cylinder.

As in the operation of plants, the flow of vapor from the generator or generators may be constant, but the pressure may vary, provision is made for maintaining a substantially constant static pressure in the generator. To this end provision is made for operating the frame 29 which is connected to the stack damper and to the stoking mechanism by and in accordance with changes in the static pressure of the steam flowing through the conduit C. As hereinbefore stated, the lower diaphragm 6 is subjected on its underside to a constant pressure substantially equal to the normal working pressure in the generator while its upper side is subjected to the static pressure of the vapor flowing through the conduit C and hence any change in the static pressure in this conduit will effect a movement of the lower diaphragm 6. This lower diaphragm is connected by a lever 16 and a bell crank lever 34 to the lower end of the swinging member 26, the latter being pivotally connected to the bell crank. In case of a drop in static pressure in the conduit the lower diaphragm 6 will be forced upward by the constant pressure on its lower side and thereby through the lever 16 and bell crank lever 34 will shift the lower end of the swinging member 26 to the right, the member turning on the pivotal pin carried by the shoe 33; this movement of the swinging member 26 operating through the link 27 will so move the bell crank consisting of the arms 22 and 23, as to open the valve mechanism 25 and permit the entrance of fluid under pressure to the same end of the cylinder as when said valve mechanism is opened by the movement of the diaphragm 5 above described. On the movement of the piston of the cylinder 28, the swinging member will be shifted on its pivotal connection with the bell crank 34 in the opposite direction after a predetermined movement of the piston by the movement of the rod along the shoe 33 and thereby through the link 27 and bell crank consisting of the arms 22 and 23, close the valve mechanism 25. It will be observed that the movement of the piston when operated by increased flow through the conduit or a drop in static pressure in the conduit, will be in the same direction.

Figure 1:
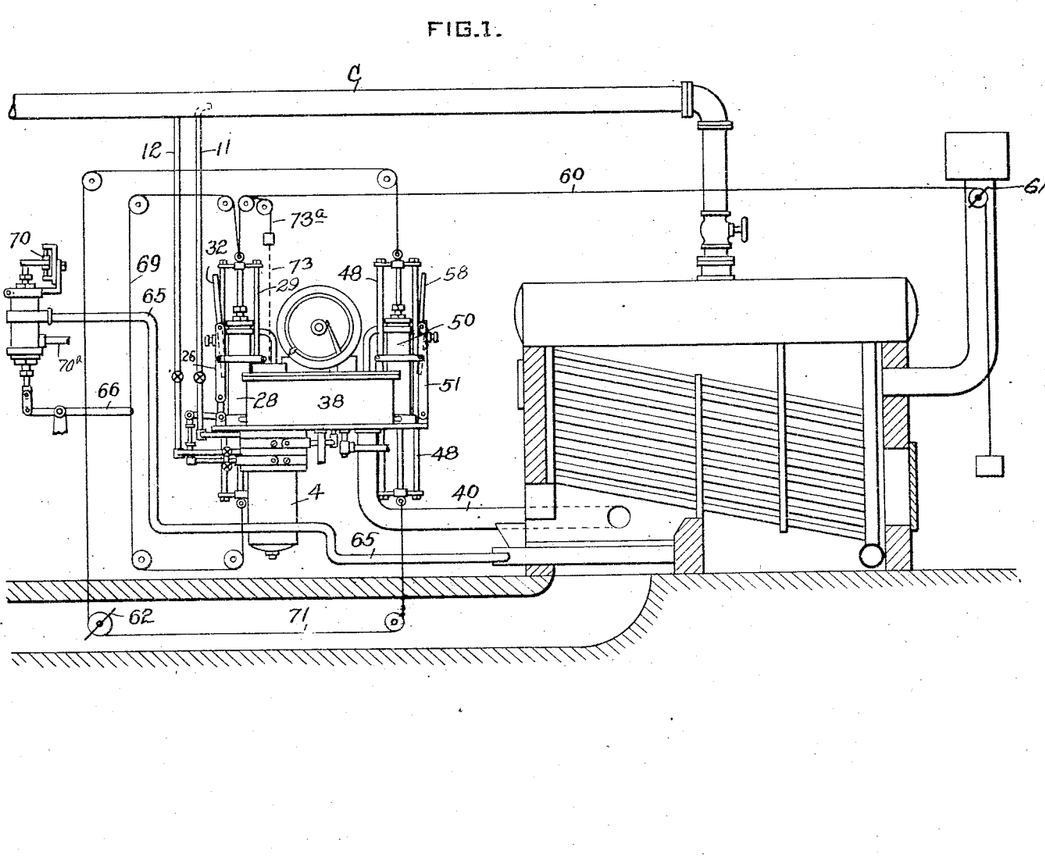
Figure 1 is a diagrammatic view showing a combination of a generator and mechanism for regulating the escape of products of combustion from and the feed of fuel to the furnace of a generator operated by and in accordance with changes in the rate of flow of vapor from and by and in accordance with changes in the pressure vapor in the generator and mechanism operative by and in accordance with changes of pressure in the furnace of the generator for so controlling the feed of air to such furnace as to maintain a minus pressure in the furnace.

The frame 29 is, in the arrangement shown in Fig. 1, connected by any suitable means as a cord 60, to the means employed for regulating the discharge of products of combustion from the stack, as for example, the stack damper 61, so that in the case of either an increased flow of vapor through the conduit or drop of static pressure in the conduit, this damper or controlling mechanism will be shifted to permit an increased flow of products of combustion from the furnace. Provision is made for increasing the feed of fuel to the furnace simultaneously with the opening of the stack damper for the causes above mentioned. In the construction shown in Fig. 1, the frame 29 is connected by suitable means such as the cord 69 to a valve mechanism controlling the flow of fluid under pressure through the pipe 65 to the cylinder of the stoking mechanism. The valve mechanism employed therefor is the type or construction shown and described in Letters Patent, Brown and Reeser, No. 1,247,217, dated November 20, 1917, and consists of an external shell adapted to be connected to a source of supply of fluid under pressure by a pipe 70ᵃ and to the stoking mechanism by a pipe 65. Within this shell is arranged an inverted cup which is adapted to be reciprocated by a lever 66 connected by the cord 69 to the frame 29, as above stated, and mechanism indicated at 70 is employed for rotating this valve when shifted longitudinally, whereby a very accurate adjustment of the flow of fluid to the stoking mechanism is obtained.

In addition to controlling the flow of products of combustion and the feed of fuel to the furnace by and in accordance with variations in the rate of flow of vapor from the generator and by and in accordance with changes of static pressure, provision is made for regulating the control of the feed of air to the furnace of the generator by and in accordance with changes of pressure of gases in the furnace. To this end provision is made by suitable mechanism, preferably of the type shown and described in application Serial Number 254,975, hereinbefore referred to. This mechanism which is preferably included on the base plate with the mechanism hereinbefore described, consists of a lever 35 connected on opposite sides of the pivotal point to inverted cups 36 and 37 immersed to a suitable depth in a liquid contained in a tank 38 said tank being provided with supply pipe 38ᵃ and an overflow pipe 38ᵇ. A pipe or tube 40 leading from the fire box of the generator is connected to the nozzle 41 projecting up into one of the cups as 36 and as the lower end of this inverted cup is sealed by the liquid, any change of pressure in the furnace will cause a corresponding shifting of the lever 35. The cup 37 is employed to govern the movements of the lever 35. To the shaft of the lever 35 is secured an arm 44 having its outer end connected by a link to the frame 46, similar in construction and operation to the frame 20 hereinbefore described and adapted to shift the movable member of the pilot valve 47 which controls the admission of fluid under pressure to a cylinder 50 having its piston rod connected to a frame 48 see Fig. 5. Within this frame 46 is mounted a shaft 55 having arms 54 and 56, the latter being connected to the movable member of the pilot valve mechanism 47 and the former connected by a link 53 to the swinging member 51 as shown in dotted lines in Fig. 2. This swinging member has a shoe 59 pivotally connected to it, said shoe being provided with a groove for the reception of the bar 58 which is so mounted on a block carried by the frame 48 as to be capable of adjustment to angular position relative to the axis of the cylinder 50. In this construction an opening movement of the valve 47 will permit the flow of fluid pressure to the cylinder 50 thereby shifting the piston of the latter and on a predetermined movement of the piston, the rod 58 will be shifted through the shoe carried by the swinging arm and dependent upon the angular position of the bar 58, the swinging member will be shifted in a direction and for a distance to close the pilot valve mechanism 47 and prevent further movement of the piston in the cylinder 50. This operation is similar to that described in connection with the mechanism shown at the left in Fig. 4. The frame 48 is connected by any suitable means such for example as a rope 71 to the means employed for regulating the flow of air through the conduit to the underside of the fuel in the furnace. In the construction shown, this regulating means consists of a damper or valve 62.

It has heretofore been the practice to so adjust the mechanism employed for controlling the feed of air to the furnace and operative by and in accordance with the pressure of gases in the furnace as to maintain an approximately uniform pressure in the furnace, the supply of air being regulated only indirectly by changes in the static and the dynamic pressures of the vapor flowing through the outlet pipe of the generator. If the rate of flow of vapor should change or there be a change in the static pressure of the vapor, the means controlling the escape of products of combustion would be shifted, thereby changing the pressure of gases in the furnace and this change in gas pressure would cause an increase or reduction in the supply of air so as to restore former pressure conditions in the furnace, such conditions having no relation to the operation of the generator, i. e., whether operating at normal or other than normal rate of combustion.

In order to provide for the maintenance of a minus pressure, i. e., a pressure below atmospheric, in the furnace and to vary that pressure inversely with changes in demand on the generator, provision is made for regulating the discharge of gases and the feed of air by and in accordance with the rate of flow of vapor from the generator or to changes in static pressure or to changes in both the static and dynamic pressures of vapor flowing from the generator.

To these ends the mechanism controlling the discharge of gases and the feed of air are so adjusted that a pressure slightly below atmospheric pressure is maintained in the furnace when the generator is operating at normal rate demand on the generator, and suitable means are provided whereby when there is an increased demand on the generator causing a shifting of the stack damper, there will not be an immediate increase in the feed of air, but such feed will be retarded until the pressure in the furnace has been reduced to a point below that established for normal demand on the generator, such means being operative by and in accordance with changes in the rate of flow or by changes in the static pressure or by changes in both dynamic and static pressure. In the construction shown a series of connected weights or a chain 73 are connected to the frame 29 and suspended over a basin 74 on the lever 35 carrying the cups 37 and 38, so that when the frame 29 is shifted to open the damper 61, one or more of the weights or a portion of the chain will be deposited in the basin which is so arranged on the lever 35 as to resist the movement of the lever due to a drop in pressure in the furnace. The weight applied to the lever will be proportional to the movement of the frame 29, the movements of which are proportional to changes in the rate of flow or to changes in the static pressure or both.

It will be understood that when the stack damper is open, there will probably be a drop in pressure in the furnace below that desired for operation at the increased demand on the generator, but the opening of the damper 62 in the air conduit will restore the pressure in the furnace not to the point established for normal demand on the generator but to a lower point determined by the weight applied to the lever 35 which in turn is regulated by and in accordance with the changes in the dynamic and static pressure in the conduit C. The pressure will remain at this new point until there occurs a further change in the demand on the generator. If such change is in the direction of an increased rating, thereby requiring the further opening of the stack damper, there will be additional weights applied simultaneously to the lever 35. Thus it will be seen that under all conditions a minus pressure will be maintained in the furnace and that there will be a further reduction of pressure inversely to the increased demand on the generator.

Figure 4:
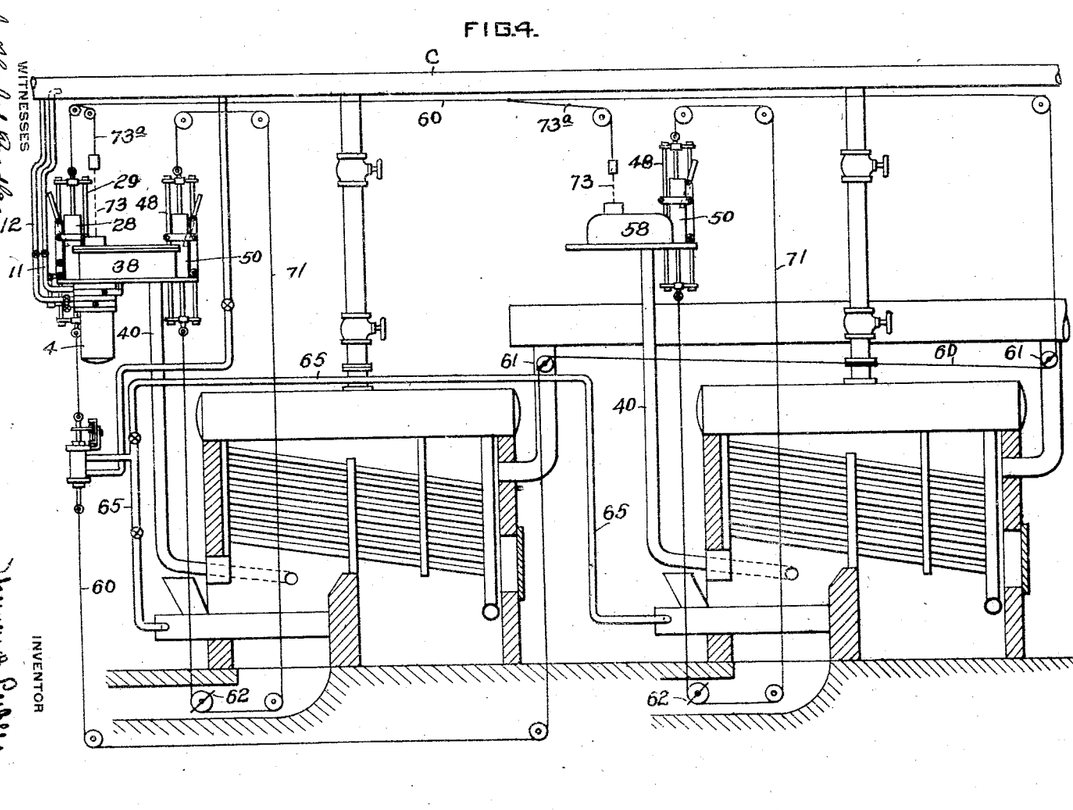
Fig. 4 is a diagrammatic view showing the escape of products of combustion from and the feed of fuel to furnaces of a plurality of generator units by and in accordance with changes in the rate of flow and with changes in the static pressure of vapor flowing through a conduit connected to all the units and the supply of air to the furnace of each unit controlled by the pressure of gases in the furnace of such units.

In Fig. 4 the improvement is shown as applied to a plurality of units forming a battery. In this case, the stack dampers and the feed of fuel and air to all the furnaces are controlled by and in accordance with changes in the rate of flow of vapor from the generators or with changes in the static pressure, or changes in both dynamic and static pressure, but the supply of air to each of the respective units is further regulated by and in accordance with changes of pressure in the furnace resulting from fuel bed conditions in each of the units. As for example, the arrangement of controlling the shifting of the stack dampers 61, the feed of fuel and the supply of air for the first unit is similar to that described in connection with the arrangement shown in Fig. 2 but for the second unit and all other units a separate furnace machine is employed for controlling the feed of air; and the weighing of the levers 35 of the furnace machines of the respective units is controlled by the master regulator which is operated by and in accordance with the flow of vapor from the generator or in accordance with changes in static pressure or both dynamic and static pressures in common conduit C. In the construction shown, the weights or chain 73 are connected to a cord 73ª passing over a guide pulley and fastened to the cord 60 through which the several stack dampers are operated.

Figure 3:
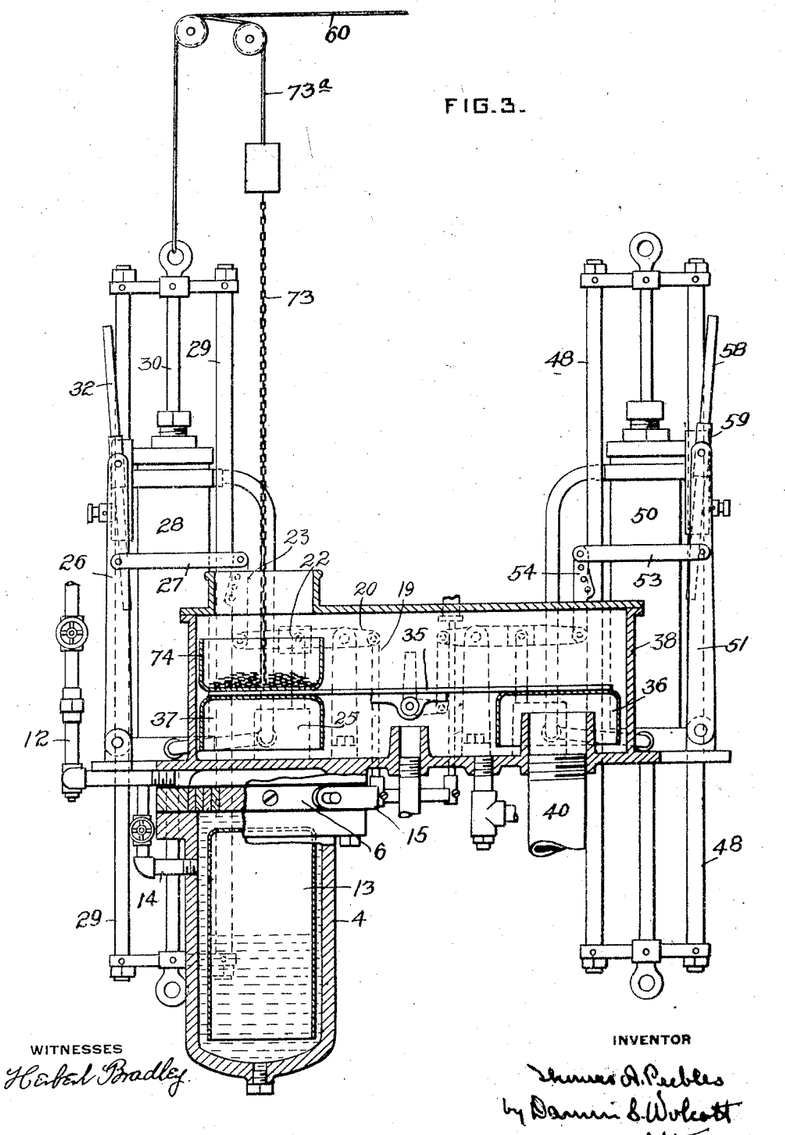
Fig. 3 is a view similar to Fig. 2 but showing a form of mechanism for controlling the escape of products of combustion and the feed of fuel operative by and in accordance with changes in the static pressure of the vapor in the generator.

As shown in Fig. 3, the improvement can be utilized where the discharge of products of combustion and the feed of fuel are controlled by and in accordance with changes of pressure in the generator. In this construction the furnace machine, operative by changes of pressure in the furnace and controlling the supply of air to the furnace, is regulated in its operation by the means operative by pressure in the generator, the latter controlling the adjustment of weights regulating the operation of the furnace machine.

As shown in Fig. 3, the chamber above the diaphragm 6 is so connected to the generator either through the conduit C or directly through the pipe 12 as to be subjected to the static pressure in the generator and the opposite side of the diaphragm is subjected to a constant pressure equal or approximately equal to the normal working pressure in the generator, such pressure being applied to the diaphragm through a fluid pressure cushion, as shown and described in the application hereinbefore referred to. The movement of the diaphragm due to changes in pressure in the generator, is transmitted by a lever 15 and rod 19 to the frame 20 which as hereinbefore described is connected to the movable member of the valve mechanism 25 controlling the flow of fluid pressure to the cylinder 28. The movements of the piston of said cylinder and the frame 29 carried thereby are regulated by compensating mechanism, as above described, and the frame 29 is connected by a cord 60 to the stack damper. A mechanism preferably similar in construction and operation to that shown in Figs. 1 and 4, is employed to shift the air supply damper 62 by and in accordance with changes of pressure in the furnace of the generator following the shifting of the stack damper. The operation of the furnace machine to shift the air damper 62 is controlled by and in accordance with changes in pressure in the generator preferably in the manner above described, i. e., weighting the lever 35 of the furnace machine.

Figure 5:
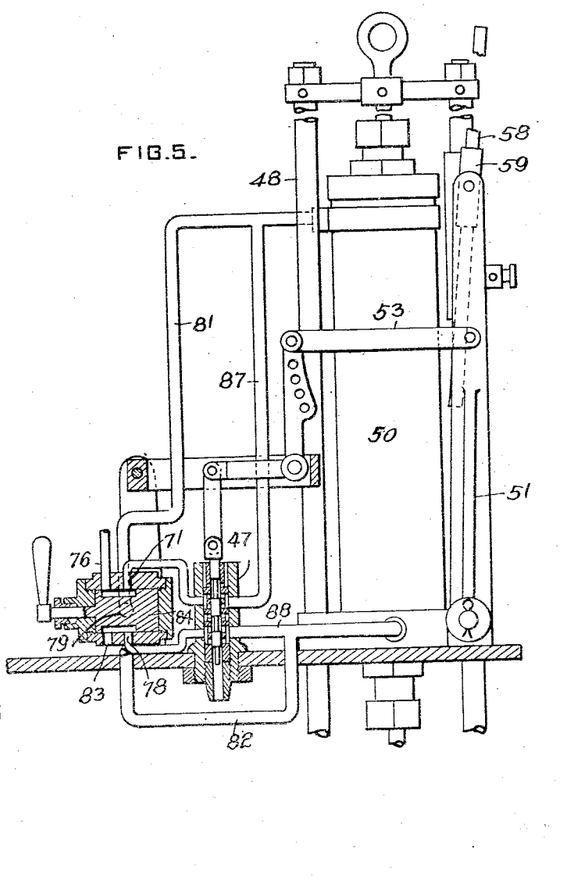
Fig. 5 is a view partly in section and partly in elevation showing a manually operated mechanism for controlling the operations of the automatic regulating mechanisms.
Figures 6, 7, 8:
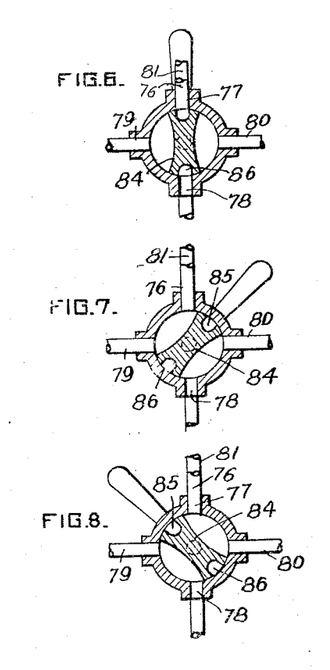
Figs. 6, 7 and 8 are diagrammatic views illustrating the operations of the manually operated controller.

In order to give the operator complete control of the combustion conditions, provision is made for stopping the automatic operations hereinbefore described of either one or both of the regulating mechanisms in either a position where the stack damper is opened fully and feed of air stopped, or where the stack dampers are closed and the feed of air stopped. While these ends can be attained in many ways, it is preferred to employ manually operative valve mechanisms shown in Fig. 5, to control the flow of fluid under pressure to and from the pilot valve mechanisms 25 and 47 which are automatically operated, as hereinbefore described, to regulate the flow of fluid pressure to and from the cylinders 28 and 50. In Fig. 5 a suitable construction of manually controlled valve mechanism is shown in connection with a pilot valve 47 of the cylinder 50, but it should be understood that the same controlling valve mechanism is intended to be employed in connection with the cylinder 28 for controlling its operations as above stated. The valve mechanism consists of a shell 75 having ports 76, 77, 78 adapted to be connected respectively to the source of fluid pressure and to the pilot valve mechanism, with ports 79 and 80 adapted to be connected to the upper and lower ends of the cylinder, such connections being formed by pipes 81 and 82 and forming by-passes around the pilot valve mechanism 47 and with an outlet or exhaust port 83. The hand operative plug 84 is provided with grooves 85 and 86 adapted when the plug is in normal position to connect the supply port 76 with the port 77 connected to the inlet port of the pilot valve and the exhaust port of the pilot valve with the outlet port 83 in the shell 75. When the plug is in normal position, as shown in Fig. 6, the regulating mechanism will operate automatically and normally the ports of the pilot valve will be connected to opposite ends of the cylinder by pipes 87 and 88, but if the plug 84 be shifted to the position shown in Fig. 7, the supply port 76 will be connected through port 79 direct to the top of the cylinder and the outlet port 83 will be connected through port 78 to the lower end of the cylinder, the connections between the shell 75 and the pilot valve mechanism being closed. When the plug 84 is shifted as shown in Fig. 7, the piston in the cylinder will be shifted and held at the lower end of the cylinder, thereby either closing or fully opening the air damper, dependent upon the arrangement of connections from the frame carried by the piston to said damper. If the connection to the air supply damper is such that a downward movement of the frame will open the damper, then by shifting the plug 84 to the position shown in Fig. 8, whereby the fluid pressure supply is connected to the lower end of the cylinder and the upper end of the cylinder to the outlet port 83, the air damper will be closed. While for convenience the manually operated valve is shown and described in connection with the furnace machine which operates the means controlling the admission of air to the furnace, a similar mechanism will usually be employed for stopping the automatic operation of the means employed for regulating the stack damper and stoking mechanism, such manually operated valve being arranged to control the flow of fluid pressure to and from the pilot valve mechanism 25.

In the operation of furnaces of steam generators, it is desirable to reduce the infiltration of air through the furnace and boiler setting to a minimum. At normal rates of operation the furnace pressure may be carried at atmospheric pressure or 1/100 or 2/100 inches of water below atmospheric, but at higher rates of operation it is found desirable to decrease this pressure in order to prevent rapid burning out of furnace brick work and possible damage to metal parts. At maximum rates of operation this furnace pressure is often maintained at 10/100 or 15/100 inches of water below atmospheric pressure and it is the purpose of this invention to automatically vary the pressures between limits in accordance with the variations in rates of demand on the generator.

I claim herein as my invention:

1. The method herein described of regulating furnaces operating under forced draft which consists in varying the pressure in the furnace chamber inversely with the varying rates of combustion.

2. The method herein described of regulating furnaces of a vapor generator operating under forced draft which consists in varying the pressure in the furnace chamber inversely with the varying demand on the generator.

3. The method herein described of regulating furnaces operating under forced draft which consists in maintaining in the furnace chamber a pressure less than atmospheric pressure and varying inversely with the varying rates of combustion.

4. The method herein described of regulating furnaces of a vapor generator operating under forced draft which consists in maintaining in the furnace chamber a pressure less than atmospheric pressure and varying inversely with the demand on the generator.

5. The method herein described of regulating furnaces operating under forced draft which consists in discharging gases from the furnace at different rates and simultaneously supplying air to the furnace at rates varying inversely with the varying rates of combustion.

6. The method herein described of regulating furnaces which consists in discharging gases from the furnace in quantities proportional to varying rates of combustion and supplying air to the furnace at such rates that the pressure in the furnace will vary inversely with the rates of combustion but at such a rate as to maintain under such varying rates of combustion pressure below atmospheric pressure.

7. The method herein described of regulating furnaces of a vapor generator operating under forced draft which consists in discharging gases from the furnace in quantities proportional to varying demands on the generator and supplying air to the furnace at such rates that the pressure in the furnace will vary inversely with the demands on the generator but at such a rate as to maintain under such varying demands on the generator a pressure below atmospheric pressure.

8. The combination with a combustion chamber, means for supplying air thereto and means for maintaining therein a pressure below atmospheric pressure and for automatically varying such pressure inversely with varying rates of combustion.

9. The combination with the combustion chamber of a vapor generator operating under forced draft, means for supplying air thereto and means for maintaining therein a pressure below atmospheric pressure and for automatically varying such pressure inversely with varying demands on the generator.

10. The method herein described of regulating the combustion in the furnace of a vapor generator operating under forced draft which consists in controlling the supply of air to the furnace by and in accordance with changes of pressure of gases in the furnace, controlling the discharge of products of combustion from the furnace and regulating the operation of the air controlling means by and in accordance with changes in the rate of flow from the generator and by and in accordance with changes of vapor pressure in the generator.

11. The combination of a vapor generator having a furnace, mechanism operative by and in accordance with the pressure of gases in the furnace for feeding air to the furnace and means operative by and in accordance with pressure in the generator for controlling the discharge of products of combustion from the furnace and regulating the feed of air to the furnace.

12. The combination of a vapor generator having a furnace, mechanism operative by and in accordance with the pressure of gases in the furnace for feeding air to the furnace and means operative by and in accordance with pressure in the generator for controlling the discharge of products of combustion from the furnace, feeding fuel to the furnace and regulating the feed of air to the furnace.

13. The combination of a vapor generator having a furnace, means operative by and in accordance with changes of pressure in the generator for controlling the discharge of products of combustion from the furnace, means operative by and in accordance with changes of pressure of gases in the furnace for regulating the supply of air to the furnace and means operative by the pressure of vapor in the generator for so regulating the air controlling means that the air will be supplied to the furnace at a rate which will maintain a pressure in the furnace, varying inversely with the pressure of vapor in the generator.

14. The combination of a vapor generator having a furnace, means operative by and in accordance with changes in the rate of flow of vapor from the generator and by and in accordance with changes of pressure in the generator for regulating the discharge of products of combustion from the furnace, means operative by and in accordance with changes of pressure of gases in the furnace for controlling the supply of air to the furnace and means for so regulating the air controlling means that the quantity of air supplied to the furnace will maintain a pressure varying inversely to the rates of combustion.

15. The combination of a vapor generator having a furnace, means operative by and in accordance with changes in the rate of flow of vapor from the generator and by and in accordance with changes of pressure in the generator for regulating the discharge of products of combustion from the furnace, means operative by and in accordance with changes of pressure of gases in the furnace for controlling the supply of air to the furnace and means for so regulating the air controlling means that the quantity of air supplied to the furnace will maintain a pressure varying inversely to the demands on the generator.

16. The combination with a combustion chamber of a blower for supplying air thereto and means for automatically varying the supply of air to maintain a pressure in the furnace varying inversely to the rate of combustion.

17. The combination with a combustion chamber of a vapor generator, of a blower for supplying air thereto and means for automatically varying the supply of air to maintain a pressure in the furnace varying inversely to the demands on the generator.

18. The combination with a combustion chamber, of a blower for supplying air thereto, means for establishing therein a pressure below atmospheric pressure and means for varying such pressure inversely proportional to varying rates of combustion.

19. The combination with a combustion chamber, of a blower for supplying air to said chamber, means for establishing therein a pressure below atmospheric pressure and for varying such pressure inversely to varying rates of combustion said means comprising apparatus for varying the exhaust of gases from the furnace and substantially simultaneously so varying the supply of air to the furnace that the pressure in the furnace will not exceed a minus pressure.

20. In combination with a furnace, means for varying the escape of gases from the furnace in quantities graduated between the extremes, a blower, and means for varying the supply of air to the furnace from the blower in such quantities so graduated between the extremes as to maintain a pressure in the furnace inversely proportional to the graduated quantities of gases discharged from the furnace, the parts being so automatically controlled that minus pressures are maintained in the furnace.

21. The method herein described of regulating combustion in the furnace of a vapor generator operating under forced draft which consists in controlling the discharge of gases from the furnace by and in accordance with the rate of flow of vapor from the generator, controlling the feed of air to the furnace by and in accordance with changes of pressure in the furnace and regulating the controlled feed of air by and in accordance with changes in the rate of flow of vapor from the generator.

22. The method herein described of regulating combustion in the furnace of a vapor generator operating under forced draft which consists in controlling the feed of air to the furnace by and in accordance with changes of pressure in the furnace controlling the discharge of gases from the furnace and regulating the controlled feed of air to the furnace by and in accordance with changes of vapor pressure in the generator.

23. The method herein described of regulating combustion in the furnaces of a plurality of vapor generators operating under forced draft which consists in controlling the discharge of gases from all of the furnaces by and in accordance with the rate of flow of vapor through a conduit supplied by all the generators, controlling the feed of air to each of the furnaces by and in accordance with the pressure in the respective furnaces, and regulating such controlled feed of air to each furnace by and in accordance with the rate of flow of vapor from all the generators.

24. The method herein described of regulating combustion in the furnaces of a plurality of vapor generators operating under forced draft which consists in controlling the feed of air to each of the furnaces by and in accordance with the pressure in the respective furnaces, controlling the discharge of gases from all of the furnaces and regulating the controlled feed of air by and in accordance with the pressure of vapors in all of the generators.

25. The method herein described of regulating combustion in the furnaces of a plurality of vapor generators operating under forced draft which consists in controlling the feed of air to each of the furnaces by and in accordance with the pressure in the respective furnaces, controlling the discharge of gases from all of the furnaces and regulating the controlled feed of air by and in accordance with the pressure of vapors in all of the generators and by and in accordance with changes in the static pressure of vapor in all of the generators.

In testimony whereof I have hereunto set my hand.

THOMAS A. PEEBLES.